United States Patent [19]

Gloskey et al.

[11] 4,048,294

[45] Sept. 13, 1977

[54] PREPARATION OF STANNIC OXIDE

[75] Inventors: Carl R. Gloskey, Wilton, Conn.;
Stanley Littman, Edison, N.J.

[73] Assignee: M&T Chemicals Inc., Greenwich, Conn.

[21] Appl. No.: 628,361

[22] Filed: Nov. 3, 1975

[51] Int. Cl.$^2$ ............................................. C01G 19/02
[52] U.S. Cl. ......................................... 423/618; 106/3
[58] Field of Search ...................... 423/87, 618; 106/3

[56] References Cited
U.S. PATENT DOCUMENTS

| | | | |
|---|---|---|---|
| 489,624 | 1/1893 | Bertou | 423/618 |
| 529,100 | 11/1894 | Bang et al. | 423/618 |
| 824,398 | 6/1906 | Acker | 423/618 |
| 1,119,547 | 12/1914 | Spitz | 423/618 |
| 1,529,261 | 3/1925 | Lubowsky | 423/618 |
| 2,621,109 | 12/1952 | Richter | 423/618 |

FOREIGN PATENT DOCUMENTS 263,034  12/1926  United Kingdom ................. 423/618

*Primary Examiner*—O. R. Vertiz
*Assistant Examiner*—Wayne A. Langel
*Attorney, Agent, or Firm*—Robert P. Auber; Kenneth G. Wheeless; Robert Spector

[57] ABSTRACT

An improved method is provided to reproducibly obtain stannic oxide of a type suitable for polishing plastic lenses. The optical density, bulk density and color of the oxide are within specified limits.

1 Claim, No Drawings

PREPARATION OF STANNIC OXIDE

BACKGROUND

This invention relates to the preparation of stannic oxide. More particularly, this invention relates to a method for preparing stannic oxide of a type suitable for use as a polishing material for optical lenses and other light transmitting media formed from synthetic resins. Heretofore it has been difficult to reproducibly obtain a grade of stannic oxide with the properties that make it a desirable polishing agent for optically clear plastic materials. Too large a particle size or particles exhibiting dendritic or acicular projections usually cause excessive abrasion and scratching of the relatively soft lens surface. If the average particle size is too small, the particles may not be sufficiently abrasive to provide the desired polishing action. Even if the particle size is within the desired range, the shape of the particle, its hardness or both may cause an excessive amount of scratching.

It has now been found that by controlling certain process parameters during precipitation of hydrated stannic oxide and the subsequent calcining required to convert the oxide to the anhydrous form it is possible to reproducibly obtain a material which is a suitable lens polishing agent.

SUMMARY OF THE INVENTION

This invention provides a method for preparing particulate anhydrous stannic oxide exhibiting a bulk density of between 6.3 and 9.0 g. per cubic inch, an optical density of between 200 and 400 and a Gardner color of between 3 and 6, said method consisting essentially of the following steps:

a. precipitating hydrated stannic oxide by the gradual addition of an aqueous solution of sodium bicarbonate to an aqueous solution of sodium stannate that exhibits a pH of between 8 and 9;

b. treating the resultant hydrated stannic oxide sequentially with an aqueous solution of sodium carbonate followed by an aqueous solution of sulfuric acid exhibiting a pH of between 3.5 and 4;

c. washing the hydrated stannic tin oxide to remove the sulfuric acid;

d. calcining the hydrated stannic oxide at a temperature between 950° and 1050° C. for a sufficient time to convert the hydrated oxide to an anhydrous form exhibiting a Gardner color of between 3 and 6.

e. classifying the resultant anhydrous stannic oxide to remove any fraction wherein 90% of the particles are larger than 4.0 microns in diameter, and f. isolating the resultant anhydrous stannic oxide.

DETAILED DESCRIPTION OF THE INVENTION

The parameters that distinguish the stannic oxide obtained using the process of the invention from the oxide obtained using prior art procedures include a relatively uniform particle size distribution wherein between 25 and 40% of the particles are less than 1 micron in average diameter, between 45 and 60% are smaller than 2 microns in diameter and substantially none are larger than 37 microns. The crystallites that constitute the particles are between about 100 and 300 angstroms in average diameter. The uniform, small size of the particles and crystallites is responsible for the relatively high value of optical density, which is between 230 and 350. The bulk density of the particles is between 6.3 and 9.0 g. per cubic inch (103 and 148 g./cm.$^3$), and the color between 3 and 6 on the Gardner scale. This color is between light and medium yellow, and is characteristic of stannic oxide that has been calcined at a temperature between about 950° and 1050° C. Stannic oxide that has been calcined at higher temperatures is white, and too hard for use as a lens polishing material. If the oxide is calcined for too long a period of time, the crystallite size will exceed the desired range of between 100 and 300 angstroms, with the result that the oxide particles may be too abrasive.

The term "optical density" employed to define one parameter that characterizes stannic oxide prepared in accordance with the present method is a function of the extent to which green light is absorbed by an aqueous suspension containing 200 mg. of stannic oxide particles per liter of water. The optical density (O.D.) is expressed by the equation $$O.D. = (\log I_o/I) \times 100$$

wherein $I_o$ represents the intensity of the incident light and $I$ is the intensity of the light transmitted through this sample. The values of optical density disclosed in the present specification were obtained using a Fisher® electrophotometer equipped with a green filter (No. 525). The suspension of stannic oxide particles may also contain a small amount of a surfactant such as Calgon® water conditioner to facilitate dispersing the stannic oxide particles. The concentration of surfactant is about 0.1% by weight. The suspension should be agitated until placed in the spectrophotometer to ensure obtaining a representative sample and reproducible data.

The bulk density values disclosed in the present specification can be obtained using any convenient method which will prevent packing of the particles. The density values reported in the accompanying examples were measured using a Scott Volumeter available from Fisher Scientific, Inc.

In addition to exhibiting a proper particle size distribution, the bulk density of the stannic oxide must be within the specified limits to ensure that the particles do not have sharp edges that could cause scratching of the relatively soft plastic lens surfaces. When particles of this type of stannic oxide are allowed to fall under their own weight into a container, the sharp protrusions will not allow the particles to be so tightly packed as particles with more rounded surfaces. The resultant larger volume of free space within the container accounts for the lower bulk density of the more irregularly shaped particles. Stannic oxide suitable for use as a polishing material must therefore be defined in terms of color, optical density and bulk density. Hydrated stannic oxide particles which conform to all of the aforementioned limits can be prepared by reacting sodium stannate and sodium or other water-soluble alkali metal bicarbonate in an aqueous medium. The stannate solution contains preferably between 6 and 8% by weight of tin. The pH of the aqueous stannate solution is adjusted to between 8 and 9 by the addition of a suitable base, such as an alkali metal hydroxide, to ensure that the stannate will be retained in solution.

Hydrated stannic oxide is precipitated by adding an aqueous solution of the alkali metal bicarbonate, preferably sodium bicarbonate, to an aqueous solution of sodium stannate. To avoid formation of excessively large particles the stannate solution should be thoroughly agitated to ensure proper mixing of the two reagents. For large capacity reaction vessels, such as would be employed for a commercial scale process, it may be necessary to introduce the bicarbonate solution at a point just below the level of the agitator to ensure adequate blending of the two reagents. The manner of addition may not be critical in small reaction vessels (1 liter capacity or less) such as would be employed in a laboratory.

The rate at which the bicarbonate salt solution is added to the sodium stannate exerts a profound effect on the particle size distribution of the resultant hydrated stannic oxide. To achieve the particle size distribution that characterizes the products of the present method, the rate of addition of bicarbonate should be such that a stoichiometric amount is added at a uniform rate over a period of between 5 and 15 minutes. Shorter addition times have been found to result in an average particle size which is too small for effective polishing. If the rate of addition is too slow, the sizes of the particles and crystallites may exceed the present limits.

The concentration of the stannate and bicarbonate solutions is not critical, however to maximize volume efficiency and make the best use of the volume available in the reactor, it is preferable to employ relatively concentrated solutions, for example those containing more than about 10% by weight of solution.

The reaction between sodium stannate and sodium bicarbonate to form hydrated stannic oxide is practically instantaneous at ambient temperature, however to ensure completeness of the reaction and maximize product yield it may be desirable to continue stirring the reaction mixture for a short period of time following addition of the bicarbonate solution. The resultant mixture of solid and liquid phases can optionally be heated to between ambient and 95° C. for several minutes for the purpose of "digesting" the solid hydrated stannic oxide.

The precipitated hydrated stannic oxide, which is believed to be present in the form known as meta-stannic acid, is then washed with an aqueous solution of sodium carbonate followed by treatment with sulfuric acid. The weight of sodium carbonate present in the solution is preferably equal to about half the weight of the hydrated oxide. Following removal of the supernatant liquid containing the sodium carbonate the oxide is combined with warm water in an amount preferably equal to between about 5–10 times the weight of oxide. Concentrated sulfuric acid is then gradually added to the resultant mixture with agitation until the pH of the liquid phase is between 3.5 and 4. Care should be taken not to add an excess of acid, since this will dissolve some of the oxide. The solid phase is then allowed to settle, after which the solid is washed two or more times with water to remove substantially all of the acid. Following removal of the water from the final wash the hydrated stannic oxide is preferably dried prior to being calcined.

The final step of the present method involves calcination of the hydrated stannic oxide for the purpose of converting it to the anhydrous form. This is conveniently accomplished by placing the dry hydrated oxide in an oven that is maintained at a temperature of between 950° and 1050° C. The hardness of the final oxide is directly proportional to calcining temperature. If the temperature is above or below the present limits, the oxide particles are either too hard or too soft for use as a polishing material for plastic lenses. The calcined material is then classified to remove any particles larger than about 4 microns. A convenient classification method employs a hydrocyclone. This step can be omitted if no significant fraction of outsized particles are present.

Stannic oxide that has been properly calcined in accordance with the present method is light to medium yellow in color, which is equivalent to a Gardner color of between 3 and 6, as specified hereinbefore and in the accompanying claims. Stannic oxide that has been calcined at temperatures below 950° C. is often red or pink in color while oxide calcined above 1050° C. is usually white.

Stannic oxide prepared in accordance with the present method is eminently suitable as a polishing agent for plastic lenses for eye glasses and other plastic optical devices. Plastic lenses are often shaped from a suitable blank that is usually circular. The desired surface curvature is obtained by grinding using an aqueous suspension of a relative coarse abrasive. Final shaping is accomplished using a suspension of a fine abrasive.

Once the desired surface curvature has been achieved, the lens is rinsed with water to remove the abrasive grinding agent and dried. At this stage the lens exhibits a uniformly abraded, opaque surface. The final step in the lens forming process is the polishing operation, which removes the abrasions formed during the shaping operation to yield an optically transparent product. In accordance with a conventional procedure, the convex surface of the lens to be polished is secured to a suitable holder located above a polishing pad to which is supplied an aqueous slurry containing between 25 and 30% by weight of stannic oxide particles. The concave surface of the lens is maintained in contact with the polishing pad under a load of about 15 pounds (6.8 kg.). The lens is oscillated and the pad is rotated while the aqueous stannic oxide slurry is being supplied to the surface of the pad. After 15 minutes of polishing the lens is removed from the holder, washed free of polishing agent, dried and examined to determine the extent of polishing and the number of visible scratches. The degree of polishing is determined by reflecting the image of a glowing bulb filament onto each segment of the lens surface. Areas wherein the image appears distorted are referred to as "gray" areas. The extent of distortion or "graying" is rated on a numerical scale defined as follows:

7 — No gray (perfect image in all areas)
6 — Light gray at edge (slight distortion)
5 — Light gray throughout
4 — Gray edge
3 — Heavy gray edge
2 — Heavy gray throughout
1 — Very heavy gray throughout The extent and depth of scratching is evaluated using a second numerical scale from 4 (no scratches) to 1 (deep scratch). A grayness rating of 5 and a scratch rating of 2 is considered the minimum for a commercially acceptable lens.

The following examples demonstrate preferred embodiments of the present method for preparing stannic oxide and compares the performance of these materials as a lens polishing agent with the performance of stannic oxide prepared using prior art methods.

EXAMPLE 1

This example discloses a preferred embodiment of the present method for preparing stannic oxide that is suitable for use as a polishing material for plastic lenses. An aqueous solution of sodium stannate was prepared by dissolving 90.7 kg. ($2.25 \times 10^3$ mole) of sodium hydroxide in 7,358 liters of water. To the resultant solution was added 1428.8 kg. ($5.357 \times 10^3$ mole) of sodium stannate, $Na_2Sn(OH)_6$. The solution was then heated to 80° C., at which time 10,245 liters of an aqueous solution containing 1406 kg. of sodium bicarbonate was introduced below the surface of the stirred sodium stannate solution at a rate of between 946 and 1326 liters per minute. The resultant mixture of liquid and solid phases was heated until the temperature reached 95° C., at which time the liquid phase was removed by decantation. The solid material remaining in the reaction vessel was washed sequentially with a heated aqueous solution of sodium carbonate and an aqueous solution of sulfuric acid exhibiting of pH of 3.6, followed by additional water washings as required until the solid phase exhibited a mutual conductance of 1000 micromhos. The mixture was then diluted to 25% solids and the solid phase was isolated by spray drying. The solid was then calcined at a temperature of 1000° C. for 1 hour, at which time the oxide exhibited a Gardner color rating of between 3 and 6, a bulk density of 7.7, measured using a Scott volumeter, and an optical density of 427, measured as described hereinbefore. When tested as a polishing agent in accordance with the procedure described hereinbefore, the polished lens was free of scratches and exhibited only a slight distortion or "gray" at the perimeter. The oxide was therefore considered to have met the requirements for a commercial polishing agent.

Examination of the oxide using an electron microscope revealed the particles to be composed of crystallites between 100 and 300 angstroms in size. The crystallites appeared rounded and were not clearly defined when compared with crystallites of material which had been calcined at a higher temperature or at the same temperature (1000° C.) for longer periods of time. The latter material produced severe scratching when evaluated as a polising agent.

EXAMPLE 2

This example demonstrates that the rate of addition of sodium bicarbonate solution affects the ultimate performance of the calcined product as a polishing agent. To 1000 cc. of an aqueous solution containing 500 g. of sodium stannate and 30 g. of sodium hydroxide was added 1000 cc. of an aqueous solution containing 159 g. of sodium bicarbonate. In one instance the bicarbonate solution was added gradually over a period of 3 minutes. In a second experiment the bicarbonate solution was added as a single portion to the sodium stannate. The solid phase from both experiments was isolated, washed with water and dried. The materials were then separately calcined at a temperature of 950° C. for a period of 2 hours in accordance with the present method.

The stannic oxide that was precipitated rapidly proved to be a poor polishing agent. The bulk density of this material was 10.2 and the optical density was 125.

The oxide obtained by the gradual addition of the bicarbonate exhibited a bulk of 7.5, an optical density of 119 and was an acceptable polishing agent.

EXAMPLE 3

This example demonstrates the effect of calcining temperature on the polishing perfomance of stannic oxide.

The hydrated oxide was precipitated by the gradual addition of an aqueous sodium bicarbonate solution to a solution of sodium stannate using the procedure described in Example 1, but on a laboratory scale. The precipitated oxide was isolated, washed with sodium carbonate solution and dilute sulfuric acid as described in the preceding Example 1 and dried. The oxide was then calcined for 2 hours at the temperatures set forth in the following table.

| Calcining Temp. (° C.) | Bulk Density g./in.$^3$ | Optical Density | Gardner Color | Polishing Rating |
|---|---|---|---|---|
| 800 | 8.3 | 275 | 8 | Heavy "gray" |
| 850 | 8.5 | 265 | 8 | Heavy "gray" |
| 900 | 9.1 | 267 | 8 | Gray |
| 950 | 9.0 | 271 | 6 | Adequate polishing |
| 1000 | 9.1 | 271 | 5 | Adequate polishing |
| 1050 | 9.1 | 272 | 3 | Light scratching |
| 1100 | 9.5 | 248 | 2 | Heavy scratching |
| 1150 | 9.8 | 237 | 1 | Very heavy scratching |

The color of the stannic oxide is a function of the calcining temperature. Even though the bulk density and optical density of the particles are within the present limits, the Gardner color rating must be between 3 and 6 to obtain acceptable performance as a polishing agent.

EXAMPLE 4

This example demonstrates that a classification of the anhydrous, calcined oxide may be required to achieve the particle size distribution desired for a polishing grade of material.

Stannic oxide was precipitated and calcined using the procedure and relative amounts of reagents disclosed in the first part of Example 1. This material proved to be an unacceptable polishing agent in that the test lenses were badly scratched. Upon examination of the particle size distribution it was found that 9% of the particles exceeded 7 microns in average diameter, 34% were larger than 5 microns and 51% were larger than 4 microns. The bulk density of the particles was below the limit of 6.3 g. per cubic inch specified for products which are within the scope of the present invention. This batch of anhydrous stannic oxide was passed through a commercially available hydroclone to remove the larger particle size fraction. The recovered material was then reexamined to determine the particle size distribution, whereupon it was found that only 3% of the particles exceeded 4 microns in average diameter. This material proved to be an acceptable polishing agent and conformed to the limits for bulk density, optical density and Gardner color set forth in the preceding specification and in the accompanying claims.

What is claimed is:

1. A method for preparing particulate stannic oxide exhibiting an optical density of between 200 and 400, a bulk density of between 6.3 and 9.0 grams per cubic inch, and a Gardner color of between 3 and 6, said method comprising the steps of
    a. maintaining a uniformly agitated aqueous solution of sodium stannate exhibiting a pH of between 8 and 9, b. gradually adding to said uniformly agitated solution over a period of between 5 and 15 minutes a stoichiometric amount of an aqueous solution containing an alkali metal bicarbonate, thereby precipitating hydrated stannic oxide, and isolating said stannic oxide, c. washing the precipitated oxide with an aqueous solution of sodium carbonate, d. washing the precipitated oxide with aqueous sulfuric acid exhibiting a pH between 3.5 and 4, e. calcining the hydrated stannic oxide at a temperature between 950° and 1050° C. for a period of time sufficient to convert the hydrated stannic oxide to an anhydrous form exhibiting a Gardner color of between 3 and 6, and f. classifying the anhydrous oxide as required to remove a first fraction wherein 90% of the particles are larger than about 4 microns, g. recovering the remaining fraction of said anhydrous oxide.

* * * * *